(12) United States Patent
Maddox et al.

(10) Patent No.: US 7,833,097 B1
(45) Date of Patent: Nov. 16, 2010

(54) GAME PAD CONTROLLER AND SYSTEM FOR PORTABLE COMMUNICATION DEVICE

(75) Inventors: Christopher J. Maddox, Oceanside, CA (US); Mark J. Hassebrock, Frederick, CO (US); Philip Hobson Boothby, Boulder, CO (US); Michael D. Johnson, Longmont, CO (US); Robert James Stone, Arvada, CO (US); Craig Ronald Townsend, Broomfield, CO (US)

(73) Assignee: Kyocera Corporation, Kyoto (JP)

( * ) Notice: Subject to any disclaimer, the term of this patent is extended or adjusted under 35 U.S.C. 154(b) by 389 days.

(21) Appl. No.: 11/313,107

(22) Filed: Dec. 19, 2005

(51) Int. Cl.
*A63F 9/24* (2006.01)

(52) U.S. Cl. ............... 463/36; 463/37; 463/39; 463/41; 463/44; 463/46; 463/47; 463/48; 463/49; 455/556.1; 455/557; 455/575.1

(58) Field of Classification Search ........... 463/37, 463/36; 24/3.9; 455/556.1, 557, 575.1
See application file for complete search history.

(56) References Cited

U.S. PATENT DOCUMENTS 6,283,348 B1 * 9/2001 Wang .................. 224/271
6,530,838 B2 * 3/2003 Ha et al. .................. 463/36
D500,319 S * 12/2004 Wada .................... D14/401
D528,106 S * 9/2006 Lee et al. ................ D14/240

OTHER PUBLICATIONS

Samsung Game Pad for Samsung SPH-a620 (VGA1000) Cell Phone: Internet Document: "Original, Gamepad, samsung, other, novelty, Other Novelties & Accessories" at http://www.originalwireless.com/vga1000.html (accessed Dec. 19, 2005).
Internet Document: "Specifications—Mobile phone accessory—Sony Ericsson Gameboard EGB-10-" at http://www.sonyericsson.com/spg.jsp?cc=us&lc=en&ver=4000&template=pp4_1 _1&zone=pp&lm=pp4_1&pid=10110 (accessed Dec. 19, 2005.)

* cited by examiner

*Primary Examiner*—John M Hotaling
*Assistant Examiner*—Marcus D Jones (57) ABSTRACT

A game pad controller for connection to a portable phone has an outer casing and a game control unit within the casing. The front of the casing has a seat for locating the portable phone and at least one keypad adjacent the seat for user engagement to control a game. The seat has a channel for slidably receiving an adapter, which is either attached to the rear face of the phone or to a holder for the phone. A releasable latching mechanism at the inner end of the channel releasably secures the adapter in the channel. The adapter may be a dimpled hub device. The arrangement allows the game pad controller to be used with any type of portable phone.

13 Claims, 7 Drawing Sheets

GAME PAD CONTROLLER AND SYSTEM FOR PORTABLE COMMUNICATION DEVICE

FIELD OF THE INVENTION

The present invention relates generally to portable communication devices such as mobile or cellular phones, portable communicators, personal digital assistants (PDAs) or other handheld two way communication devices, and is particularly concerned with a game pad or game controller system for use with such portable communication devices.

BACKGROUND OF THE INVENTION

Portable communication devices such as mobile phones, PDAs and the like are often used by their owners to play games, for example to pass time when traveling or waiting for appointments. Due to the compact size of such devices, and the corresponding small size of the associated keypads, it can be quite inconvenient to try to manipulate a game using the keypad. Game pads or controllers have therefore been proposed in the past for use together with a portable communication device, the game pads having larger control buttons which are easier to manipulate and which can be manipulated with both hands simultaneously. Up to now, such devices have typically been designed to form fit to a particular phone model, so that a unique game pad or controller is required for each different phone or portable communicator model.

One example of a game pad controller, which is designed for use with a mobile phone, is the Sony Ericsson GameBoard EGB-10. This game pad controller has a carriage, which attaches to the phone, and the carriage in turn attaches to the game controller. This arrangement seats the mobile phone between left and right hand control pads of the controller, with a cable for electronic connection of the controller to the phone.

SUMMARY OF THE INVENTION

It is an object of the present invention to provide a new and improved game pad controller or module for attachment to a portable communication device, so that the communication device and game pad can be used together to play electronic games. It is a further object of the invention to provide a system including the game pad controller and an adapter for attaching the module to a portable communication device.

According to one aspect of the present invention, a game pad controller for connection to a portable communication device is provided, which comprises an outer casing, a game control unit within the casing, the casing having a socket for releasable engagement with a connector on the end of an interface cable for linking the game control unit with a portable communication device, at least one keypad on the front of the casing for user engagement to control a game, and a seat adjacent the keypad for seating a portable communication device, the seat having a channel for slidably receiving a hub mounted on the portable communication device or to a holder for the portable communication device, the channel having an inner end, and a releasable latching mechanism at the inner end of the channel for releasably securing the hub in the channel.

The channel may have a base wall on which the latching mechanism is provided and which is movable between a first position in latching engagement with the hub and a second position, which releases the hub. A biasing mechanism in the casing urges the base wall into the first, latching position. A tab extends from the base wall through an opening in the casing for engagement by a user in order to move the base wall into the second position when they want to separate the portable communication device from the game pad controller. This mechanism will securely and reliably attach the portable communication device to the game pad controller, and allows any portable communication device or phone to be easily attached to the controller. The hub may have a base for connection to the rear wall of a phone or a holder for a phone, a shaft extending from the base and an enlarged head having a plurality of dimples.

According to another aspect of the present invention, a game pad system for use with a portable communication device is provided, which comprises an adapter for securing to the rear face of a portable communication device or to a holder for the portable communication device, a game pad controller having an outer casing and a game control unit within the casing, and an interface cable for electrically connecting the game control unit to the portable communication device, the casing having a front face, a rear face, and a socket for receiving a connector at one end of the interface cable, at least one keypad on the front face for operation by a user to control a game, and a seat on the front face of the casing for seating a portable communication device connected to the game control unit, the seat having a channel for slidably receiving the adapter, the channel having a latch mechanism at its inner end for releasable engagement with the adapter.

In an exemplary embodiment of the invention, the adapter comprises a dimpled hub to mount a portable communication device using a phone clip, holster, or the like. The adapter or hub may be secured to the rear face of the phone or other communication device with adhesive or the like. Alternatively, for users who do not want to have a hub permanently secured to their phone, the hub may be releasably secured to a holder or case for the phone.

The inner end of the channel has formations for mating engagement with the dimpled hub, as well as a snap engageable latch for snap engagement with the hub. The mating formations are provided at the inner end of the base wall of the channel, and the base wall has an extension protruding through an opening in an end wall of the casing to provide a tab which can be depressed by a user in order to release the hub from the latch mechanism and allow the portable communication device to be separated from the casing. The base wall of the channel is spring loaded into engagement with the hub in the latched position.

The game pad system of this invention allows a game pad controller to be connected readily to any model of portable communication device, such as mobile phones of different sizes and configurations, for example flip phones, bar phones, slider phones, and the like. In an exemplary embodiment, the front face of the casing has left and right keypads on opposite sides of the seat so that opposite ends of the casing can be easily gripped by a user while using their thumbs to control a game as seen on the video display screen of the portable communication device.

An interface cable may be provided with a first connector at one end for connection to the interface connector of the portable communication device, and a second connector at the opposite end for connection to the socket in the game pad casing for communication between the portable communication device and the game control unit or printed circuit board within the casing for operating an electronic game. The cable may have a hub secured along its length which may be used in order to secure the cable to the casing temporarily when the controller is not in use, to reduce the risk of losing the cable.

The hub engages in the channel in the seat of the casing in exactly the same way as the dimpled hub secured to the phone or phone holder.

The game pad controller and game pad system of this invention allows a portable communication device to be easily and quickly attached to the game pad module when desired, and to be removed just as easily for use in standard communications. Once attached, the mechanical interface between the hub and channel ensures that the phone or communication device is firmly and reliably secured to the game controller. The system allows any phone to be easily interfaced with the game pad controller.

BRIEF DESCRIPTION OF THE DRAWINGS

The present invention will be better understood from the following detailed description of some exemplary embodiments of the invention, taken in conjunction with the accompanying drawings, in which like reference numerals refer to like parts, and in which.

DETAILED DESCRIPTION OF THE EXEMPLARY EMBODIMENTS

Figure 1A:
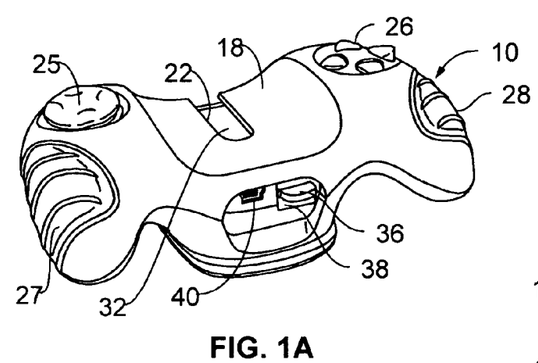
FIG. 1A is a top perspective view of a game pad controller according to an exemplary embodiment of the present invention, taken from the bottom end of the controller.
Figure 1B:
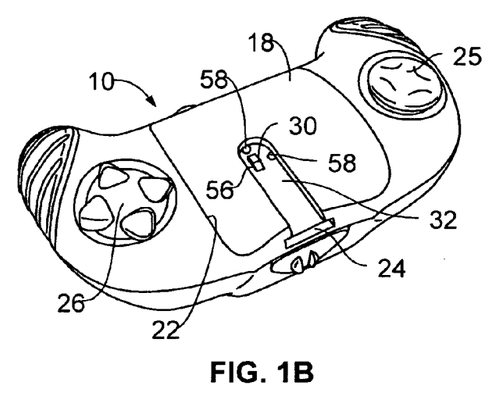
FIG. 1B is a top perspective view of the game pad controller of FIG. 1A taken from the top end of the controller.
Figure 1C:
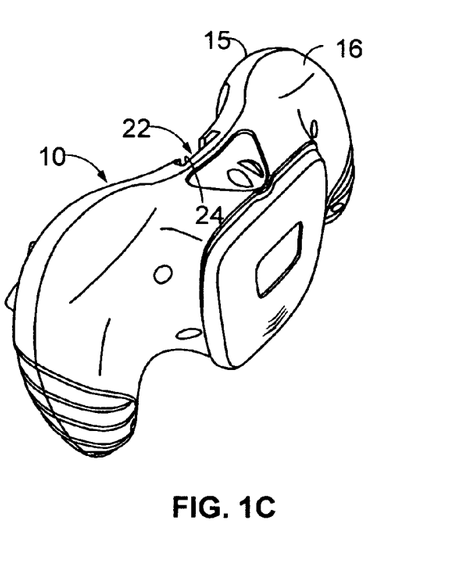
FIG. 1C is a bottom perspective view of the game pad controller of FIGS. 1A and 1B, taken from one side.
Figure 2:
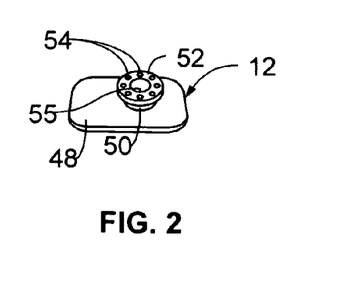
FIG. 2 is a top perspective view of dimpled hub connector forming part of a game pad system for attaching the game pad controller of FIGS. 1A to 1C to a portable communication device.
Figure 3:
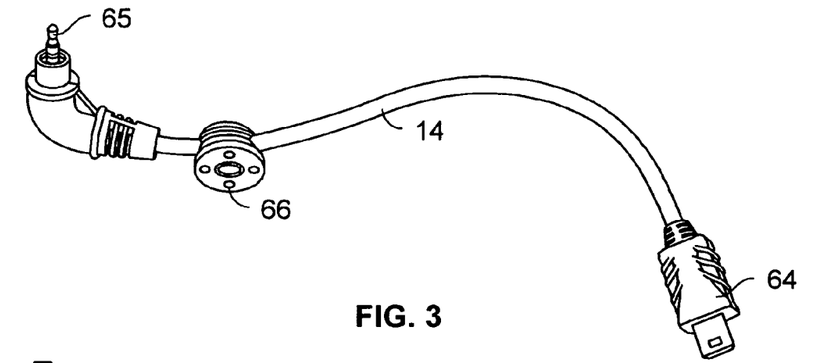
FIG. 3 is a top perspective view of a connecting lead or interface cable for electrically connecting the game pad controller of FIGS. 1A to 1C to a portable communication device.
Figure 4:
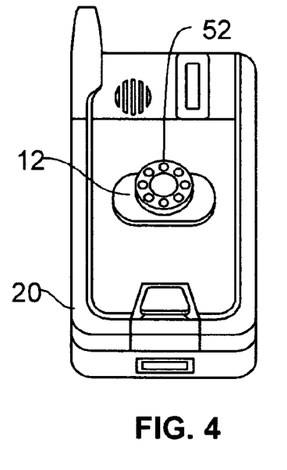
FIG. 4 is a rear perspective view of one type of portable communication device or cell phone with the dimpled hub connector secured to its rear face.

FIGS. 1A to 1C illustrate a game pad controller 10 according to an exemplary embodiment of the invention which is adapted for connection to a portable communication device such as a cell phone or the like. FIGS. 2 and 3 illustrate additional components of a game pad system for allowing the controller 10 of FIGS. 1A to 1C to be releasably connected to a portable communication device such as a cell phone, both electronically and mechanically. FIG. 2 illustrates an adapter 12 for mechanically securing a cell phone or other portable communication device to the game pad controller. The adapter 12 comprises a dimpled hub connector which may be secured to the rear face of any cell phone, such as the clamshell type cell phone 20 illustrated in FIG. 4. FIG. 3 illustrates an interface cable 14 for electronically connecting the cell phone to the game pad controller 10.

The game pad has a two part outer shell or casing having an upper part 15 and a lower part 16. The upper part of the shell has a recessed central region or seat 18 in which a cell phone 20 or the like can be seated. A slot 22 at the center of the recessed region terminates in a generally T-shaped entry opening 24 at one end of the upper part of the shell. The front face of the upper part of the casing has left and right keypads 25, 26 on opposite sides of the seat 18 and adjacent hand grips 27, 28 so that opposite sides of the casing can be easily gripped by a user while using their thumbs to control a game as seen on the video display screen of the portable communication device.

Figure 15:
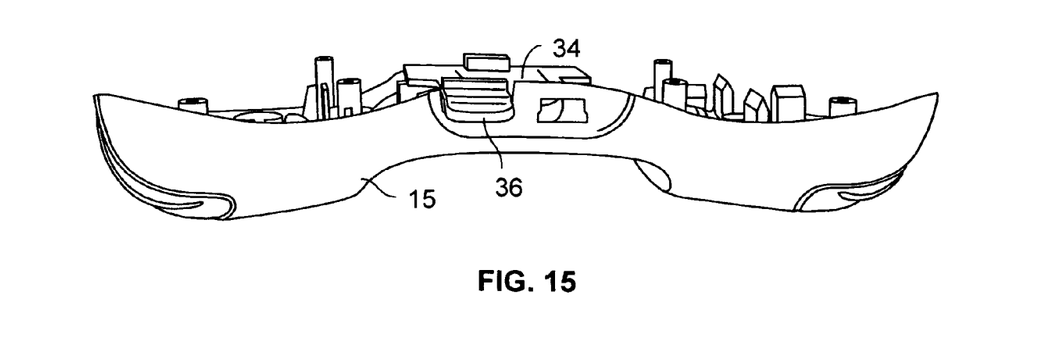
FIG. 15 is an end view of the upper part of the casing.
Figure 16:
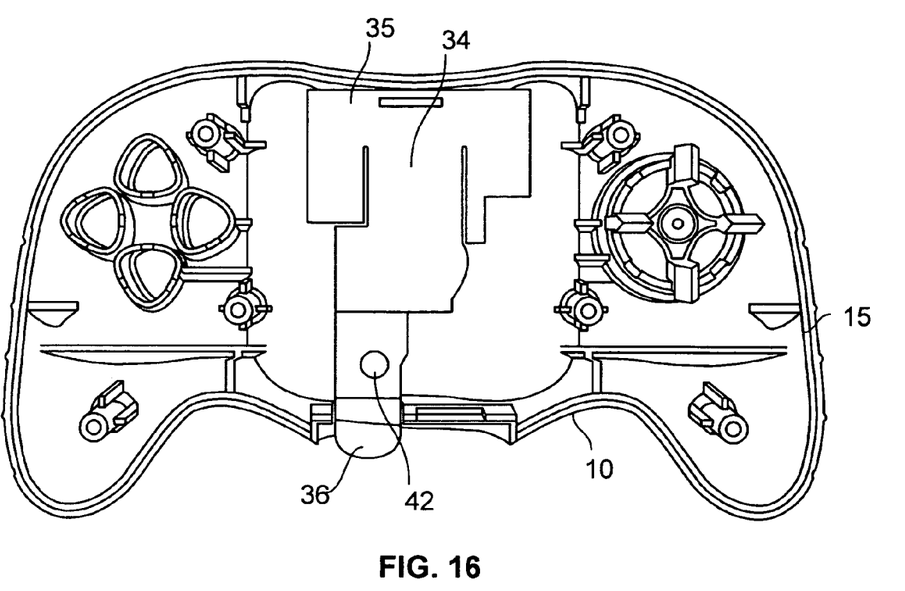
FIG. 16 is a plan view of the interior of the upper casing of the game pad controller.
Figure 17:
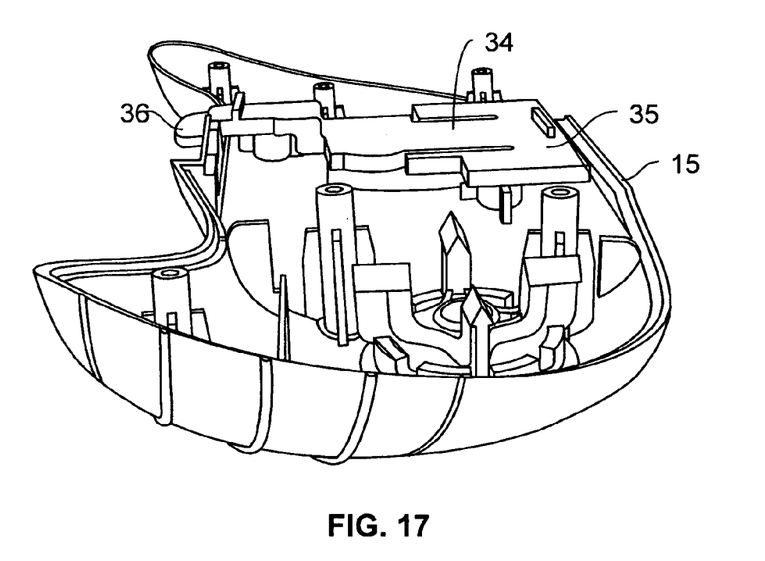
FIG. 17 is a side elevation view of the upper casing of FIG. 16.

A latching mechanism 30 is located in the base 32 of the channel at the inner end of the slot 22. The base of the channel is actually part of a larger latch plate 34 mounted inside the game pad controller casing between the upper and lower parts of the shell, as best illustrated in FIGS. 15 to 17. The latch plate 34 has a rear end 35 which is secured in the casing at one end via snap pins engaging in hollow posts in the upper part of the casing. The plate has a finger portion of reduced width which extends forwardly from the rear end across the casing and terminates in a latch release finger or tab 36 at the opposite end of the plate which extends out of the casing through an opening 38 in a recessed region in the front wall of the casing, as seen in FIGS. 1A, 16 and 17. A connector socket 40 is provided in the recessed region adjacent the latch tab opening 38, as seen in FIG. 1A. A downwardly facing bore 42 in a part of the latch finger inside the casing receives the end of a biasing spring 44 mounted in the lower part 16 of the shell (see FIG. 14) when the two casing parts are secured together. This biases the latching mechanism upwardly into a latching position in channel 22, as will be described in more detail below.

Figure 14:
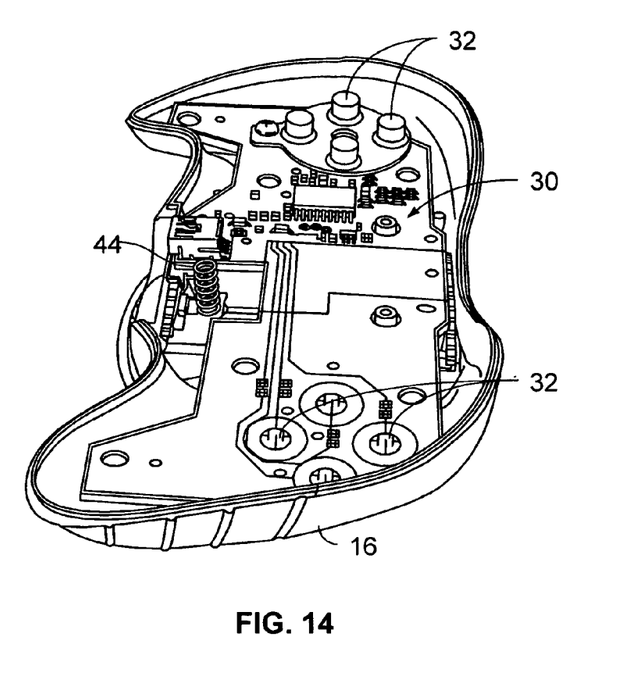
FIG. 14 is a top perspective view of the lower part of the casing of the game pad controller to illustrate the internal components.

As best illustrated in FIG. 14, a game control unit 45 is provided on a printed circuit board in the lower part 16 of the casing. This has switch pads 46 for engagement with key pad connectors in the upper part 15 of the casing when the two parts of the casing are connected together.

Figure 6:
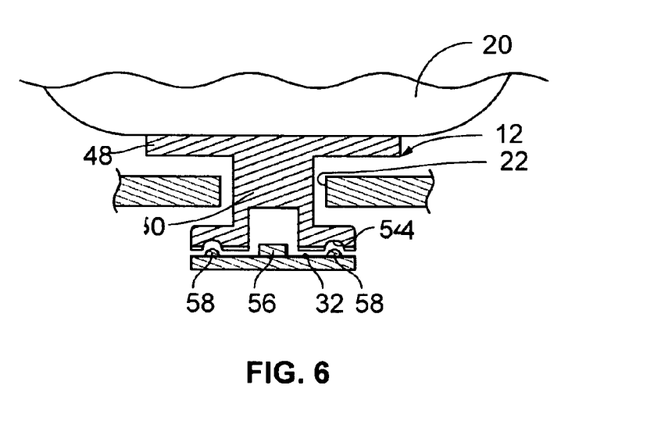
FIG. 6 is a schematic sectional view illustrating the engagement of the dimpled hub connector in the guide channel on the front face of the game pad module to secure the cell phone to the game pad controller.

The connector/latch mechanism is designed to connect to the dimpled hub 12, which may be secured to the rear face of a cellular phone or a phone case, holster or the like. The dimpled hub device 12 is illustrated in FIG. 2 and comprises a flat plate or base 48 with adhesive on its rear face covered by a peel-off cover strip, and a cylindrical shaft 50 projecting outwardly from its front face, and an annular flange or enlarged head 52 at the outer end of the shaft. The head has a plurality of spaced dimples or recesses 54 around its periphery, and a central bore 55. When the dimpled hub device is secured to the rear face of the phone 20 as in FIG. 4, the phone can be connected to the game pad controller and seated in the recessed region 18 simply by engaging the head 52 in the enlarged end of opening 18 and sliding the hub device along slot 22 until the dimpled head snaps onto the latch mechanism 30 at the inner end of the channel, as best illustrated in FIG. 6. The latch mechanism comprises a raised latch member 56 which engages in the open end of bore 55 and a series of raised bumps 58 which engage in respective dimples 54 around the periphery of the head 52. The latch mechanism may include three or more raised bumps 58.

Figure 5:
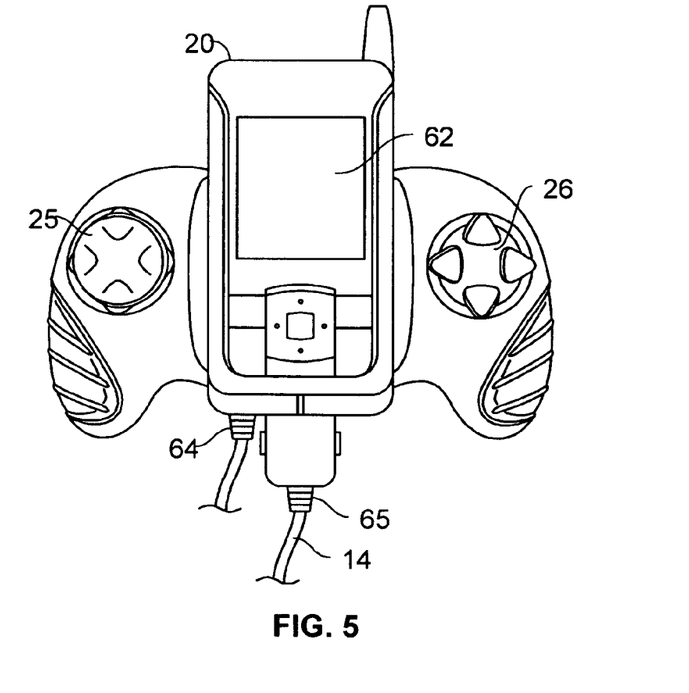
FIG. 5 is a top plan view illustrating the cell phone of FIG. 4 connected to the game pad controller of FIGS. 1A to 1C.
Figure 7:
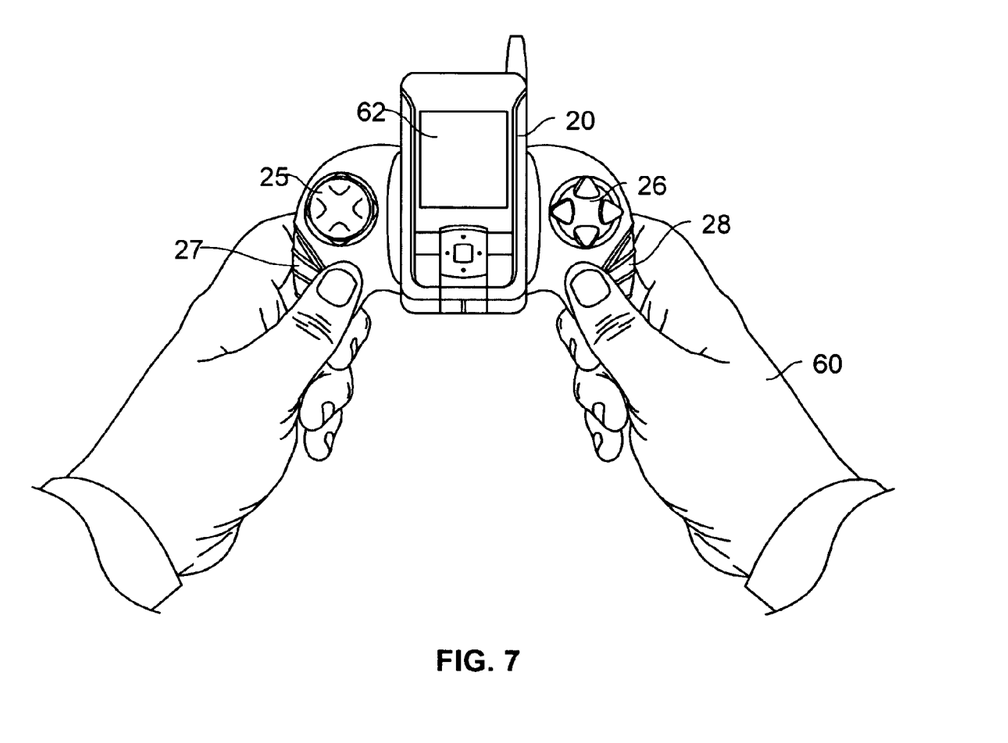
FIG. 7 is a top perspective view of the assembly of FIG. 5 illustrating the connected game pad system in use.

Once the dimpled hub is fully engaged with latch mechanism 30, the cell phone 20 is held securely in the recessed region, as indicated in FIGS. 5, 6 and 7. Spring 44 biases the plate upwardly so that the bumps 58 and latch member 56 firmly engage with the opposing recesses and bore in the head of the dimpled hub, as best illustrated in FIG. 6. The game pad controller and connected phone are then ready to use for game playing. FIG. 7 illustrates a user gripping the opposite ends of the game pad controller with their hands 60, with the screen 62 of the cell phone facing them so that a game can be played using the two key pads which they can operate using their thumbs.

The latching mechanism in the exemplary embodiment uses a dimpled hub with mating latching formations in the base of the channel. However, it will be understood that any suitable interengageable latching formations may be provided on the enlarged head of the hub and the channel in alternative embodiments, such as a tongue and slot engagement or the like.

The connector or interface cable 14 is provided for electronic connection between the game pad controller 10 and cell phone 20, as illustrated in FIG. 5. The cable 14 has a first connector 64 at one end for engagement in the socket 40 in the game pad controller, and a second connector 65 at the opposite end for engagement in a corresponding socket in the cell phone 20. A dimpled hub 66 is molded or engaged on the cable 14 so that the cable can be secured to the game pad controller when the module is not in use, as illustrated in FIG. 11.

Figure 8:
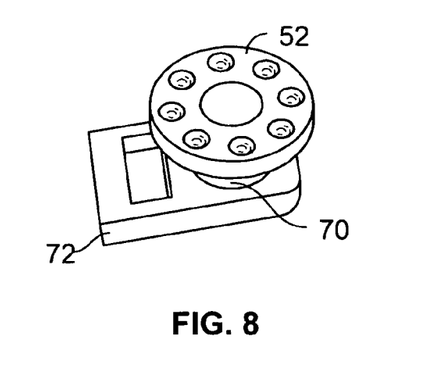
FIG. 8 is a top plan view of a modified dimpled hub connector for use in the game pad system.
Figure 9:
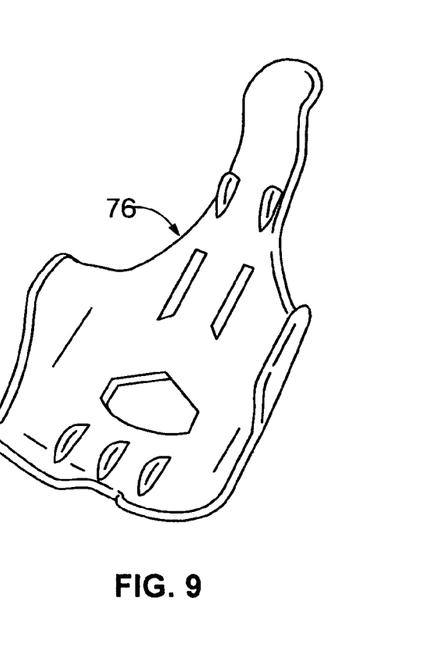
FIG. 9 is a perspective view of the inner face of a cell phone holder for optional use in the game pad system.
Figure 10:
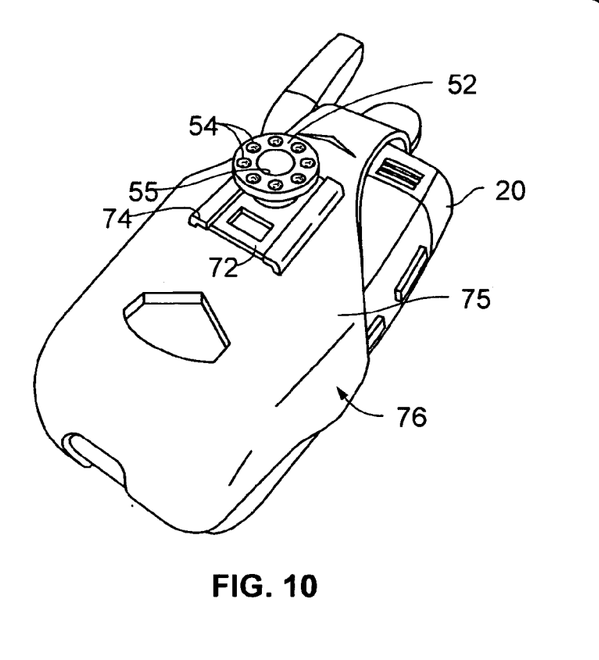
FIG. 10 is a rear perspective view of a cell phone with the cell phone holder of FIG. 9 attached, and the dimpled hub connector of FIG. 8 releasably secured to the outer face of the cell phone holder.

Although the dimpled hub is secured directly to the back of a phone in the embodiment described above, the hub may be releasably secured to a holder or case for the phone in an alternative arrangement, as illustrated in FIGS. 8 to 10. This will be more convenient for users who want to carry the cell phone in a purse or pocket when not in use. FIG. 8 illustrates a dimpled hub device 70 which is essentially identical to the hub of FIG. 2, apart from the base 72, and like reference numerals have been used for like parts as appropriate. Device 70 is designed for releasable engagement in a channel or slot 74 provided for that purpose on the rear or outer face 75 of a snap-on cell phone holder 76 which can be attached to a cell phone 20 as illustrated in FIG. 10. The inner face of the holder 76 is illustrated in FIG. 9. Similar dimpled hubs are already used for mounting cell phones on belt clips and the like, so that the dimpled hub attached directly to the phone or to a holder for the phone can be used interchangeably to secure the phone to a game pad controller or to a standard belt clip, as desired. The holder of FIGS. 9 and 10 is formed of plastic material but may alternatively be of leather or the like. The illustrated holder 70 is designed to hold a clam shell type of phone, but holders will also be provided for holding other types of cell phones such as bar and slide phones. The dimpled hub of FIG. 2 may be permanently secured to the rear or outer face of the cell phone holder in alternative embodiments.

Figures 11, 12, 13:
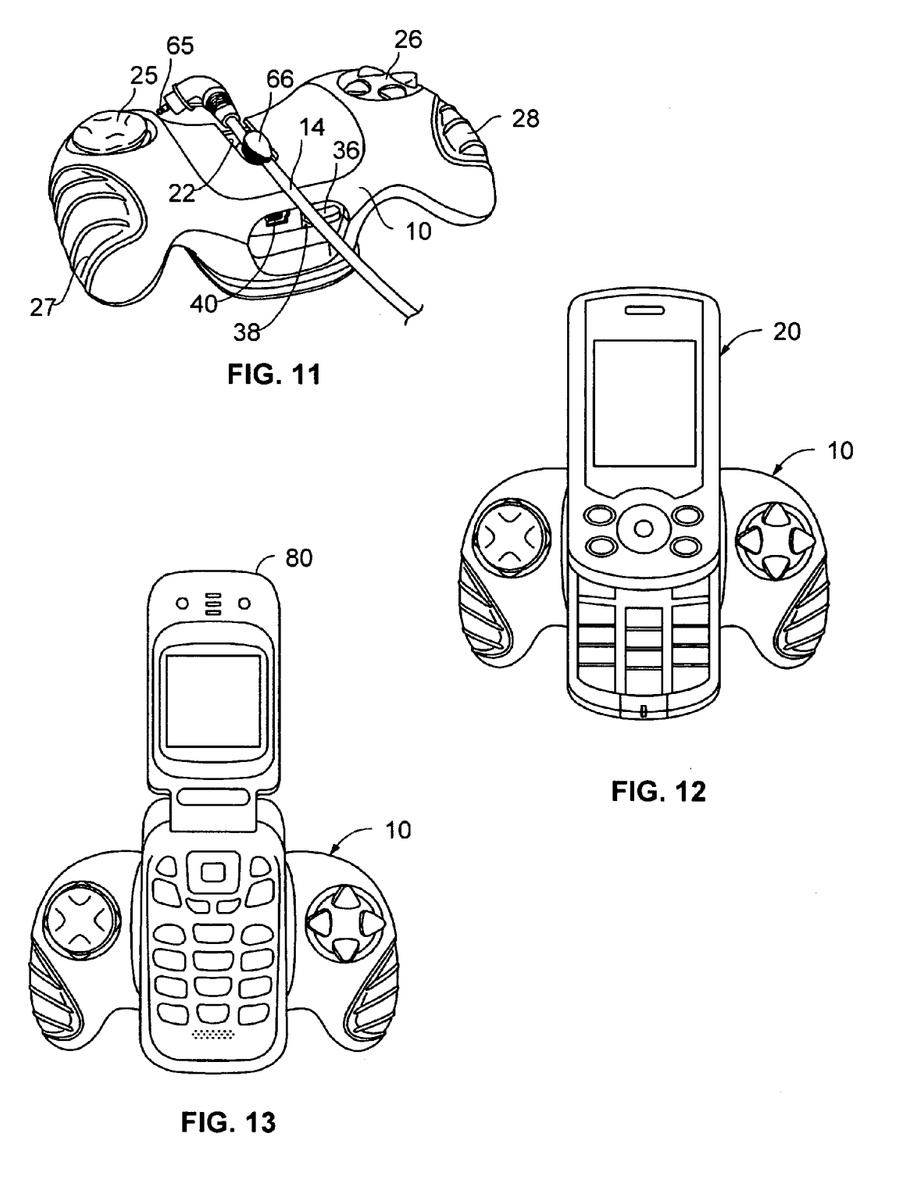
FIG. 11 is a top perspective view of the game pad controller with the interface cable releasably secured in the slot when the controller is not in use.
FIG. 12 is a top plan view of the game pad system with a different type of cell phone connected to the controller.
FIG. 13 is a top plan view of the cell phone and holder arrangement of FIG. 10 connected to the game pad controller.

FIG. 12 illustrates a bar style cell phone 80 secured to the game pad controller 10, while FIG. 13 illustrates a clam shell phone 20 as in FIG. 10 secured to the game pad controller using the dimpled hub connected to the cell phone holder 70 as in FIG. 10. The clam shell cover is open in FIG. 13 to reveal the screen 82 for use while playing a game. The clam shell phone of FIGS. 5 and 6 has an external screen 62.

The mechanical interface between the game pad controller and the cell phone or portable communication device acts to secure the cell phone firmly but releasably to the controller. The interface uses an adapter of the dimpled hub type which is similar to the hub already used to secure cell phones in suitable holders to accessories such as belt clips for convenient carrying purposes. The game pad controller is provided with a slot or channel which engages the hub and which has a secure latching mechanism at its inner end for releasable latching engagement with the dimpled hub. This mechanical interface is very quick and convenient to use. As noted above, the user simply slides the hub into the slot or channel 22 until it latches or clicks into place at the inner end of the channel. They can then play games easily while the phone they are using is firmly and reliably attached to the game pad module.

In order to release the latch, the user simply presses down on the protruding end of the latch release tab 36, simultaneously moving the latch plate downwardly and away from the dimpled hub. The user can then easily slide the hub out of slot 16 and detach the phone from the game pad controller. The phone can then be re-engaged with a belt clip or other device if desired. After the phone is detached from the controller, the interface cable 14 will be removed and the hub 66 can be engaged and latched into slot 22 to secure the cable 14 to the controller. This reduces the risk of losing the cable, which can happen if it is stored separate from the game pad controller.

The game pad controller and mechanical interface system of this invention provides a compact and easy to use game pad on which a portable communication device or cell phone can be readily mounted to provide a true gaming experience. This system allows any phone to be interfaced easily with the game pad controller, unlike other such systems which are typically designed for a single phone or family of phones. When the cell phone is secured in the seat on the game pad controller, the user can easily grip the opposite sides of the controller as indicated in FIG. 7, using their thumbs to control a game as they view the progress of the game on the cell phone screen. This is much more convenient than using the small cell phone keypad to try to control a game, and provides diagonal buttons which are not available on a standard cell phone key pad. The mechanical interface in the system of this invention is easy to use and allows the user to reliably attach his or her phone to the game pad controller. The exemplary embodiment of the system uses a dimpled hub which is equivalent to an industry standard and can therefore be used both to attach the phone to the game pad module and to attach the phone to a belt clip or the like when the game pad is not in use. The game pad controller is adapted to provide a latching mechanism for releasable and secure latching engagement with the dimpled hub.

Although some exemplary embodiments of the invention have been described above by way of example only, it will be understood by those skilled in the field that modifications may be made to the disclosed embodiments without departing from the scope of the invention, which is defined by the appended claims.

What is claimed is:

1. A game pad module for connection to a cell phone comprising:
    an outer casing having an upper part and a lower part;
    a game control unit within the casing that is communicatively coupled to a game pad module socket;
    an interface cable configured to electronically connect the cell phone to the game pad module, the interface cable comprising,
        a first connector at a first interface cable end configured to engage with the game pad module socket,
        a second connector at a second interface cable end configured to engage with a cell phone socket,
        an interface cable hub disposed between the first interface cable end and the second interface cable end, wherein the interface cable hub is configured to secure the interface cable when the interface cable is not in use;
    at least one keypad on the upper part of the casing configured to enable user engagement and control of a game, the keypad comprising diagonal buttons;
    a seat adjacent to the keypad for seating the cell phone selected from the group consisting of a clam shell cell phone, a bar cell phone and a slider cell phone;
    a cell phone hub that includes a cylindrical shaft having an outer end that projects outwardly from the cell phone;
    a channel disposed in the seat, wherein the channel includes a base wall on which a latching mechanism is provided, the latching mechanism being movable between a first position in latching engagement with the hub and a second position which releases the hub, the latch mechanism configured to receive the interface cable hub and the cell phone hub;
    the channel slidably receiving the cell phone hub when the second connector of the interface cable is coupled to the cell phone socket and the first connector of the of the interface cable is coupled to the game pad module socket;
    the channel slidably receiving the interface cable hub when the interface cable is not in use; and
    a latch release plate associated with the latch mechanism, the latch release plate having a latch release tab extending out of the casing that releases the latch mechanism that received the interface cable hub and the cell phone hub when the latch release tab is moved away from one of the interface cable hubs and the cell phone hub;
    wherein the outer casing has an opening aligned with the base wall and the latch release tab extends from the base wall through the opening in the casing to allow the base wall to be moved into the second latch release position.

2. The game pad as claimed in claim 1, further comprising a biasing device in the casing for urging the base wall into the first, latching position.

3. A game pad system for use with a cell phone, comprising:
    a game pad module having an outer casing and a game control unit within the casing;
    an adapter secured to the rear face of a holder that releasably holds the cell phone, the holder comprising an outer face having a slot for releasable engagement with the base of the adapter, the adapter comprising an adapter hub with a projecting shaft, and the cell phone selected from the group consisting of a clam shell cell phone, a bar cell phone, and a slider cell phone;
    an interface cable for electrically connecting the game control unit to the cell phone, the cable having opposite end connectors for connecting the cable to the game pad module and the cell phone and wherein the interface cable includes a cable hub that enables the interface cable to be secured to the game control unit when the game pad module is not in use;
    the casing having a front face, a rear face, and a socket for receiving the connector at one end of the interface cable, at least one keypad on the front face for operation by a user to control a game, and a seat on the front face of the casing for seating the cell phone connected to the game control unit;
    a channel disposed in the seat, wherein the channel includes a base wall on which a latching mechanism is provided, the latching mechanism being movable between a first position in latching engagement with the hub and a second position which releases the hub, the latch mechanism configured to receive the interface cable hub and the adapter hub;
    the channel slidably receiving to receive the adapter hub when the second connector of the interface cable is coupled to a cell phone socket and the first connector of the of the interface cable is coupled to the game pad module socket;
    the channel slidably receiving the interface cable hub when the interface cable is not in use; and
    a latch release plate associated with the latch mechanism, the latch release plate having a latch release tab extending out of the casing that releases the latch mechanism that received the interface cable hub and the adapter hub when the latch release tab is moved away from one of the interface cable hubs and the adapter hub;
    wherein the casing has an opening aligned with the base wall and the latch release tab extends from the base wall through the opening in the casing to allow the base wall to be moved into a latch release position.

4. The system as claimed in claim 3, wherein the adapter comprises a base, a shaft projecting outwardly from the base and an enlarged head at the outer end of the shaft for sliding engagement in the channel.

5. The system as claimed in claim 3, wherein the channel has a base wall, the latch mechanism being located on the base wall at the inner end of the channel, the base wall being movable between a first position in latching engagement with the adapter and a second position which releases the adapter.

6. The system as claimed in claim 2, wherein the adapter has a base for securing to the rear face of a phone holder, a shaft projecting outwardly from the base, and an enlarged head at the outer end of the post for sliding engagement in the channel, the head having mating formations for releasable engagement with the latch mechanism on the base wall of the channel.

7. The system as claimed in claim 6, wherein the latch mechanism on the base wall comprises a series of spaced protrusions.

8. The system as claimed in claim 7, wherein the adapter is a dimpled hub device and the mating formations on the head comprise dimples, the dimples engaging with at least some of the protrusions on the base wall in the latched position.

9. The system as claimed in claim 8, wherein the head has a central indent and the dimples are arranged at spaced intervals on a ring around the central indent, the latch mechanism on the base wall further comprising a latch member for releasable mating engagement in the indent.

10. The system as claimed in claim 6, wherein the base wall has an upper surface on which said latch mechanism is located and a lower surface, wherein a biasing spring is mounted in the casing to bear against the lower surface of the base wall to bias the latch mechanism into an operative position in latching engagement with the head.

11. The game pad system as claimed in claim 3, wherein the casing has left and right keypads on opposite sides of the seat for operation by a user.

12. The game pad system as claimed in claim 3, wherein the cable has an adapter secured along its length for releasable latching engagement in the channel of the game pad module when the module is not in use, whereby the interface cable is releasably secured to the module.

13. A method of releasably securing a mobile phone to a game pad controller, comprising the steps of:

attaching a mobile phone hub to a holder, wherein the base of the mobile phone hub is configured to be releasably engaged with the holder;

attaching a holder that includes a mobile phone hub with a projecting shaft to the mobile phone, wherein the holder is configured to be releasably attached to the mobile phone that is selected from the group consisting of a clam shell cell phone, a bar cell phone and a slider cell phone;

sliding an enlarged head of the mobile phone hub and the projecting shaft into a latch mechanism that includes a channel on a seating area on the front face of a game pad controller until latching formations on the head snap into the latch mechanism that includes latching formations in the channel to releasably secure the mobile phone hub and mobile phone to the game pad controller with the mobile phone resting on the seating area;

connecting an interface cable between a game pad socket on the game pad controller and a mobile phone socket on the mobile phone, wherein the interface cable includes a cable hub that enables the interface cable to be secured to the game pad controller when the game controller pad is not in use;

releasing the mobile phone hub from the latch mechanism by moving a latch release tab away from the mobile phone hub, wherein the latch release tab is associated with the latch mechanism and extends out of the game pad controller, wherein the latch release tab extends from a base wall, wherein a casing of the mobile phone has an opening aligned with the base wall and the latch release tab extends from the base wall through the opening in the casing for engagement by a user in order to move the base wall into a latch release position; and receiving the interface cable hub in the latch mechanism when the interface cable is not in use.

* * * * *